United States Patent Office 2,786,774
Patented Mar. 26, 1957

2,786,774

COMPOSITION FOR TREATING KNITTED HOSIERY

Fannie Lorene Seeley, Salt Lake City, Utah

No Drawing. Application May 24, 1954,
Serial No. 432,051

4 Claims. (Cl. 106—162)

The invention of which the following is a description is in a composition for treating knitted hosiery.

The broad object of the invention is to provide a composition which can be used to give hosiery improved properties. Thus it will avoid dimming the lustre of the goods and prevent the tendency to twist or slip or to be subject to damage such as snagging and runs.

One of the objects of my invention is to improve the appearance of the hosiery by providing a composition by the use of which the hosiery may be given a colorless, smooth coating which enhances its appearance.

Another object of the invention is to provide a composition which will maintain the hosiery in the straight position given it and prevent its slipping, sagging or twisting out of position.

A still further object of the invention is to increase the durability of the hose. Thus the composition when applied to hosiery serves to prevent snags and to stop runs that might otherwise occur. The improved composition may be said to harden the individual threads and thus make the hosiery capable of withstanding severe use. The coating likewise will provide a factor of adhesion between the individual threads.

Among the objects of my invention is to provide a composition having the above properties and which is readily washed out when the hosiery is laundered and may be replaced after each laundering operation.

The novel composition is composed of several ingredients which contribute to the desired properties. One of the ingredients is ammonium alum, which is aluminum-ammonium sulphate. This is used in finely powdered form. Other so-called alums may be used.

Another ingredient of the improved composition is Epsom salts, commonly known as magnesium sulphate, also used in powdered form. This material is prepared by first adding a small quantity of perfume, such as one ounce of cologne to each five pounds of Epsom salts and then drying and grinding the material.

Finally I use granulated sugar, preferably cane sugar, although beet sugar may also be used.

Equal parts of the alum, Epsom salts and sugar are mixed and finely ground. The composition is then put up in small envelopes of about one level tablespoon each.

The treating composition is used by dissolving the contents of one envelope in half a pint (1 cup) of lukewarm water. When dissolved and clarified, it is used for treating the hosiery. The washed and rinsed hose are dipped into the solution and stirred around until completely saturated. The excess solution is squeezed out and the hose smoothed and hung up to dry.

The composition is used in the form of a thin syrup which completely saturates the hosiery. On drying, this syrup forms a transparent coating on the individual threads. The result is a definite improvement in the gloss of the knitted wear.

The article in use and when worn has an added inherent stiffness which causes it to maintain the position in which it is placed and cling to the leg without any tendency to twist out of shape or to sag.

The composition also protects the hosiery against damage by snagging and in the event that a run is started, the coating serves to prevent the extension of the run.

The presence of the sugar prevents the salts from forming dry granular crystals which would impair the lustre of the threads and also binds the whole composition together as a homogeneous coating capable of reinforcing the fabric and resisting damage or running of the threads.

The coating is removed in ordinary washing and is then replaced by a fresh coating. It is observed that the use of this composition prolongs the wear of the hosiery and protects it against damage of snags and runs.

While the preferred composition has been outlined above it is to be understood that equivalent materials other than those indicated may be used and the relative quantities may vary without departing from the scope of the invention as defined in the following claims.

What I claim is:

1. A composition for treating knitted hosiery which consists of Epsom salts, aluminum-ammonium sulphate and a sugar.

2. A composition for treating knitted hosiery which comprising essentially of substantially equal parts of Epsom salts, aluminum-ammonium sulphate and a sugar.

3. A composition for treating knitted hosiery which consists of substantially equal parts of finely ground Epsom salts, aluminum-ammonium sulphate and cane sugar in dry finely powdered form.

4. A composition for treating knitted hosiery which consists of substantially equal parts of Epsom salts, aluminum-ammonium sulphate and cane sugar dissolved in water to form a thin syrup.

No references cited.